United States Patent [19]
Denndou

[11] Patent Number: 6,152,406
[45] Date of Patent: *Nov. 28, 2000

[54] PIPE FASTENER AND METHOD OF MANUFACTURE

[75] Inventor: Masashi Denndou, Toyohashi, Japan

[73] Assignee: Emhart Inc., Newark, Del.

[ * ] Notice: This patent issued on a continued prosecution application filed under 37 CFR 1.53(d), and is subject to the twenty year patent term provisions of 35 U.S.C. 154(a)(2).

[21] Appl. No.: 09/094,229

[22] Filed: Jun. 9, 1998

[30]     Foreign Application Priority Data

Jun. 10, 1997 [JP] Japan ................................... 9-151745

[51] Int. Cl.[7] ........................................................ F16L 3/22
[52] U.S. Cl. ....................................... 248/68.1; 248/74.1
[58] Field of Search ............................. 248/68.1, 55, 56, 248/57, 71, 73, 74.2, 560, 634, 65, 74.1

[56]     References Cited

U.S. PATENT DOCUMENTS

| | | | |
|---|---|---|---|
| 2,227,528 | 1/1941 | Adler | 174/135 |
| 2,404,531 | 7/1946 | Robertson | 248/68.1 |
| 3,606,318 | 9/1971 | Enlund et al. | 248/74.2 |
| 4,705,244 | 11/1987 | Saotome et al. | 248/68.1 |
| 5,002,243 | 3/1991 | Kraus et al. | 248/68.1 |
| 5,033,701 | 7/1991 | Kraus | 248/68.1 |
| 5,184,794 | 2/1993 | Saito | 248/68.1 |
| 5,271,587 | 12/1993 | Schaty | 248/68.1 |
| 5,460,342 | 10/1995 | Dore et al. | 248/74.2 |
| 5,588,683 | 12/1996 | Schliessner | 285/62 |
| 5,598,994 | 2/1997 | Olewinski et al. | 248/73 |
| 5,954,300 | 9/1999 | Sturies et al. | 248/68.1 |

*Primary Examiner*—Anita M. King
*Attorney, Agent, or Firm*—Edward D. Murphy

[57]     ABSTRACT

A pipe fastener which is capable of holding pipes without requiring a cover, attaching the pipes easily and enhancing a high mounting force of pipes while retaining the vibration absorbing function. The fastener 14 comprises a pipe holder 15 to hold pipes 2 and a panel fixing portion 17 to be fixed to a panel 5. The pipe holder 15 comprises a pipe engagement portion 18 which receives the pipes inside thereof and engages with them, a damper portion 19 of a vibration absorbing material disposed on the outer portion of the pipe engagement portion, and a holder portion 21 connected to the panel fixing portion to hold the outer portion of the damper portion. The pipe engagement portion 18, the damper portion 19 and the holder portion 21 are connected with each other as one piece.

8 Claims, 15 Drawing Sheets

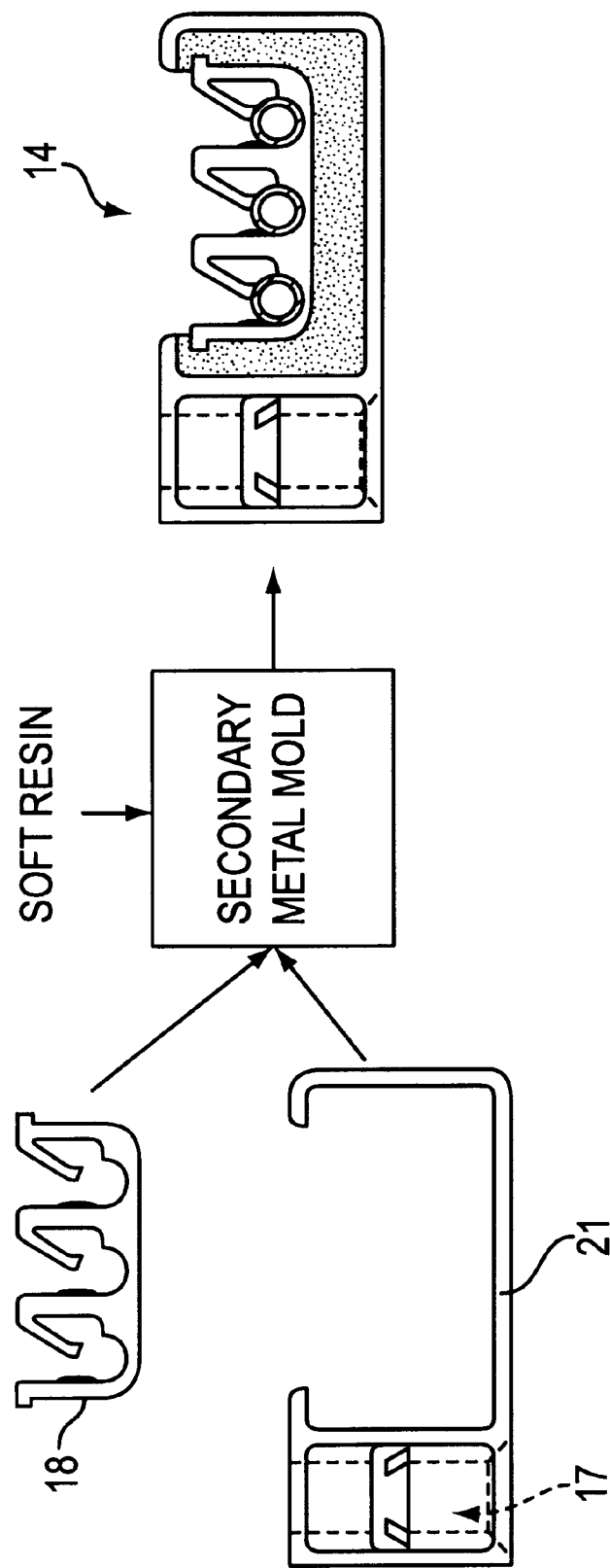

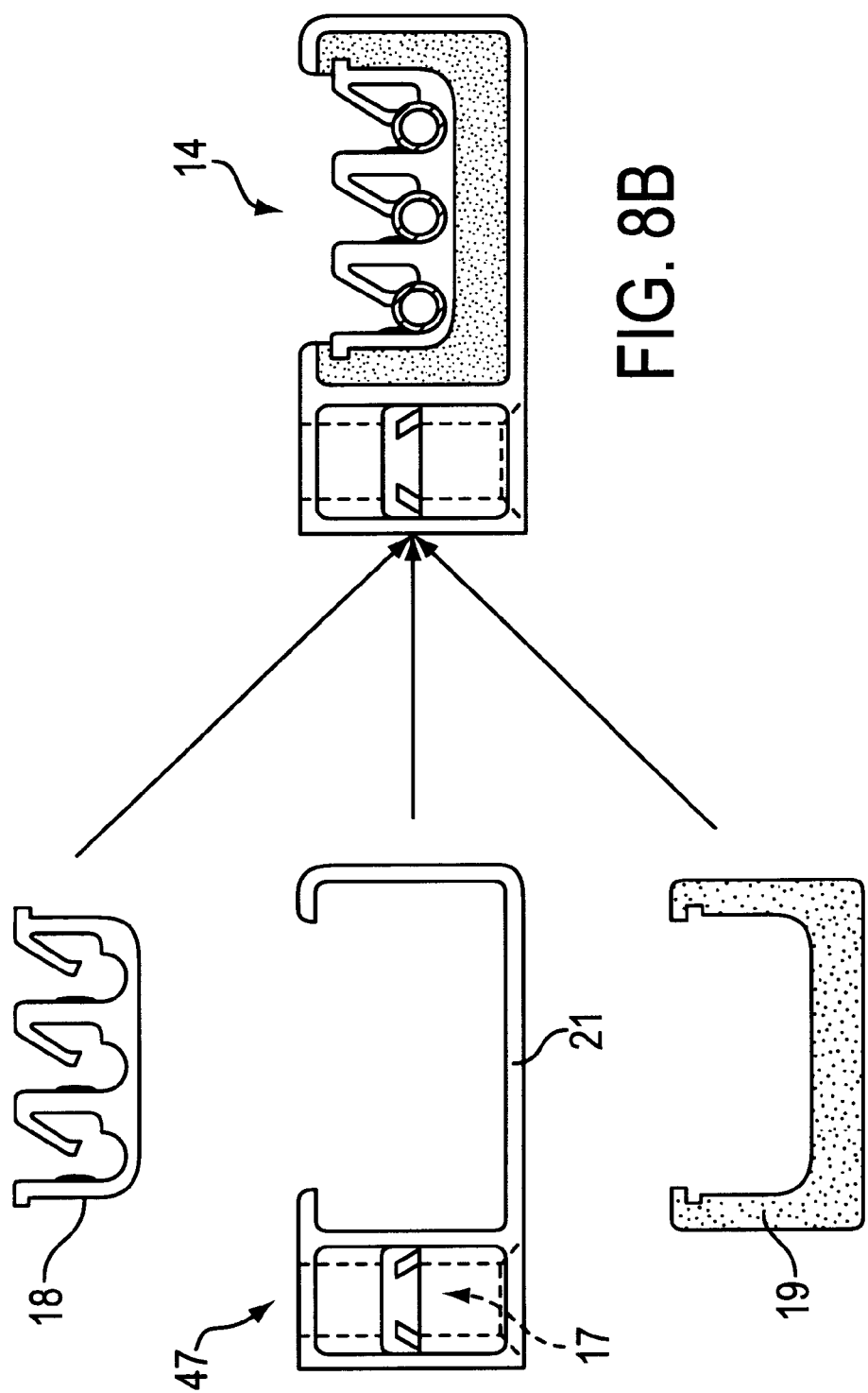

PIPE FASTENER AND METHOD OF MANUFACTURE

BACKGROUND OF THE INVENTION

The present invention relates to a fastener for holding pipe-like members such as fuel pipes and brake lines of an automobile to a panel such as a vehicle body, and a method of manufacturing the fastener.

PRIOR ART

A certain number of fasteners made of synthetic resin have been developed for holding pipes like fuel and brake pipes of automobile to a panel such as a vehicle body. For instance, Japanese Utility Model Publication Nos. 4-75289 and 5-73389 disclose such pipe fasteners. An example of such conventional fasteners is shown in FIG. 1. The fastener 1 comprises a pipe holder 3 to hold a pipe 2 and a panel fixing portion 6 to be fixed to a panel 5. The panel fixing portion 6 is fixed to the panel 5 by means of a nut 7 and a bolt 9 which are fixed to the panel 5. The pipe holder 3 has a cover 10 with a pivotable hook for receiving and holding the pipe 2. Within a pipe receiver 11 of the pipe holder 3, a damper portion 13 made of a vibration absorbing material is provided. The damper portion 13 maintains quietness in the interior of the car by absorbing vibrations transmitted via a fuel pipe and a brake pipe lest they should be transferred to the panel to which the fastener is attached.

The above-described fastener with a damper portion is preferable in that it maintains interior stillness of a car. However, it has some problems still to be solved: The vibration absorbing material of the damper portion being a resilient soft material, it is unable to hold pipe by itself and needs a pivotable cover made of a hard material to compress the damper portion for holding the pipe. This requires the work to close the damper portion with a cover, which means the pipe has to be attached to the fastener manually, that is, the pipe attachment operation cannot be automated. It is also a problem that the resilient soft material making the damper portion generally has high friction force, which reduces the mounting force of pipes.

Accordingly, the present invention aims to provide a pipe fastener which is capable of holding pipes without requiring a cover, attaching the pipes easily and ensuring a high mounting force of pipes while retaining the vibration absorbing function.

The present invention also aims to provide a method of manufacturing the above-stated pipe fastener.

SUMMARY OF THE INVENTION

In order to achieve the above objects, according to the present invention, there is provided a pipe fastener for use in fixing pipes to a panel, comprising a pipe holder to hold pipes and a panel fixing portion to be fixed to the panel; characterized in that the pipe holder comprises a pipe engagement portion which receives the pipes inside thereof and engages with the pipes, a damper portion of a vibration absorbing material disposed on the outer portion of the pipe engagement portion, and a holder portion connected to the panel fixing portion to hold the outer portion of the damper portion; the pipe engagement portion, the damper portion and the holder portion being connected with each other as one piece.

When the pipes are pressed into the pipe engagement portion and vibrations of the pipe engagement portion are absorbed by the damper portion without transmission to the holder portion and the panel fixing portion to prevent the vibrations from being transmitted to the panel. Thus, the fastener can hold the pipes while retaining the vibration absorbing function without requiring a cover, facilitating attachment of pipes and maintaining a high mounting force of the pipes.

For the above fastener, it is possible to make the pipe engagement portion and the holder portion from hard resin and the damper portion from soft resin. The panel fixing portion can provided with means which receive a stud bolt fixed to the panel and engage with it, or can be formed so as to be fixed to the panel by means of a bolt and a nut. It is also possible to form the above fastener with one panel fixing portion and two pipe holders provided on both sides of the panel fixing portion, to connect the holder portion of one of the pipe holders integratedly with the holder portion of the other pipe holder and to connect the coupling portion of the holders with panel fixing portion through a vibration absorbing member. This structure maintains quietness in the car interior because vibrations increased when a larger number of pipes are held by the holders can be absorbed sufficiently by the damper portion and the vibration absorbing member.

The present invention also provides a manufacturing method of the above-mentioned fastener, the method comprising steps of integrally molding the panel fixing portion, the holder portion of the pipe holder and the pipe engagement portion as one piece by using the same hard resin while forming thin portions to make a space in which the damper portion is to be provided, and molding the damper portion by injecting a vibration absorbing material into the space between the pipe engagement portion and the holder portion of the member molded as one piece. The above-described pipe fastener can be molded by this method.

Besides, the above manufacturing method, there is another method of manufacturing the fastener, which comprises steps of molding the panel fixing portion and the holder portion of the pipe folder as one piece by using the same hard resin, holding the pipe holder molded from the same hard resin to the holder portion of the member molded as one piece, with a space kept between them for providing the damper portion, and molding the damper portion by injecting a vibration absorbing material into the space between the pipe engagement portion and the holder portion. Still another method of manufacturing the fastener comprises steps preparing the panel fixing portion and the holder portion of the pipe holder molded as one piece by using the same hard material, the pipe engagement portion molded by using the hard resin, and the damper portion made of a soft resin vibration absorbing material, and positioning the damper portion between the pipe engagement portion and the holder portion and to connect the pipe engagement portion and the holder portion together as one piece by means of the damper portion.

BRIEF DESCRIPTION OF ACCOMPANYING DRAWINGS

Figure 2:
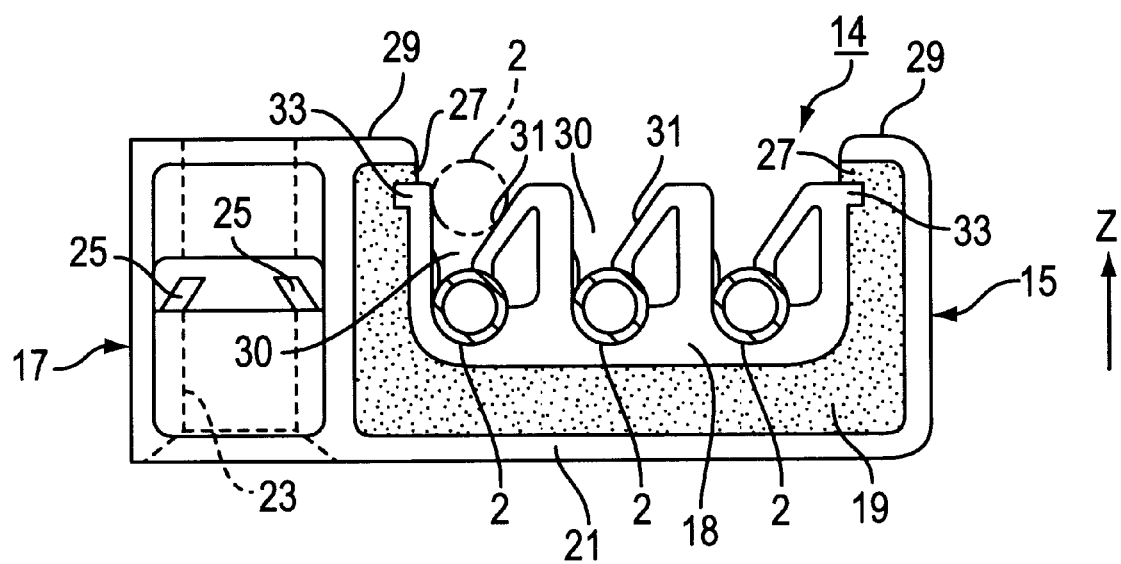
FIG. 2 is a front view of a pipe fastener of a first embodiment of the present invention.
Figure 4A:
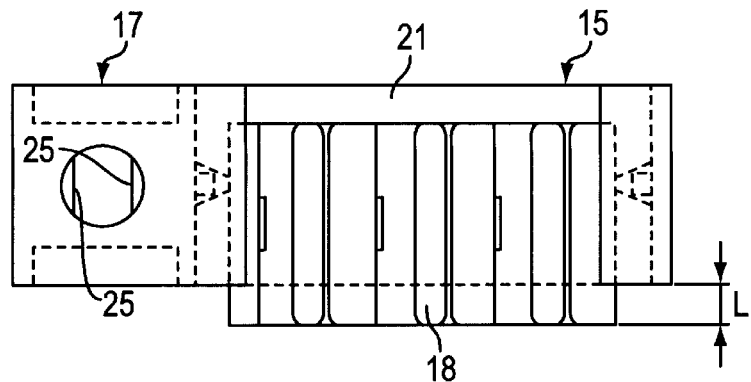
Figure 4B:
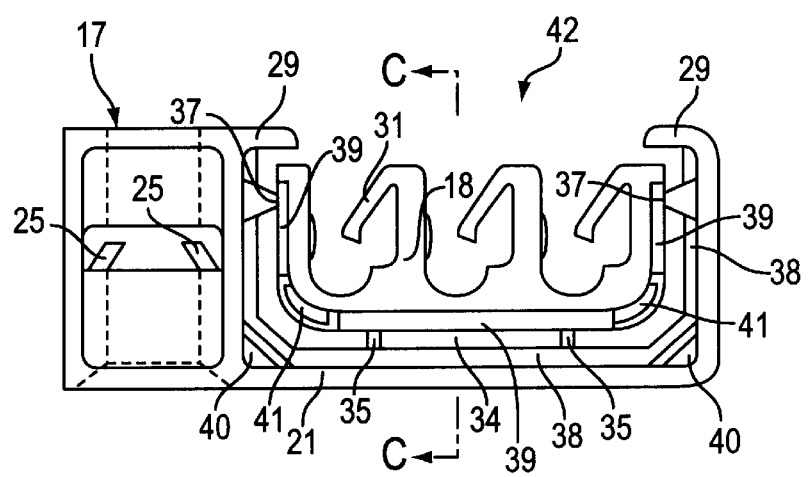
Figure 4C:
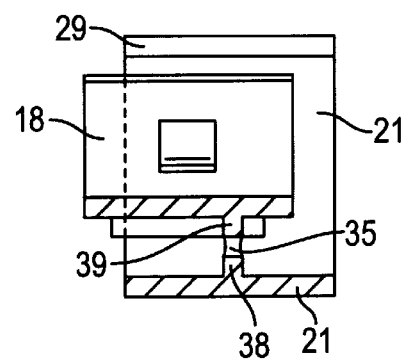

FIG. 4 showing the fastener of FIG. 2 according to the present invention in the middle of molding operation; (A) is a plan view, (B) is a front view and (C) is a sectional view taken along the line C—C of (B).

Figure 5C:
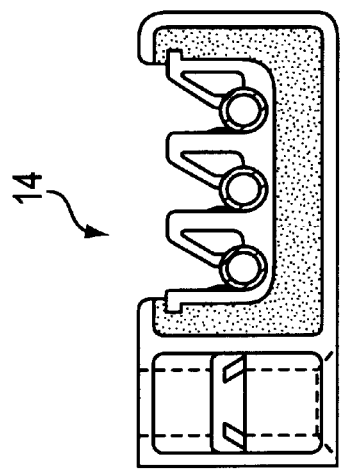
Figure 5B:
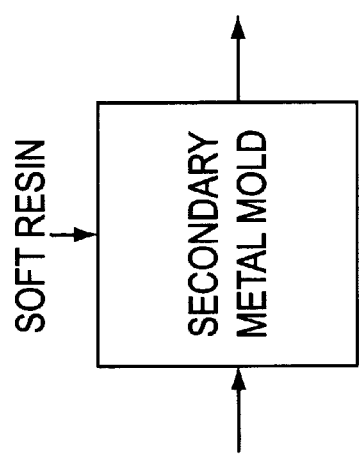
Figure 5A:
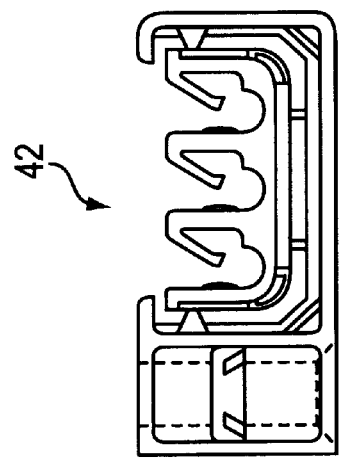

FIG. 5 is a diagram showing manufacturing steps of the fastener of FIG. 2 according to the present invention.

Figure 6A:
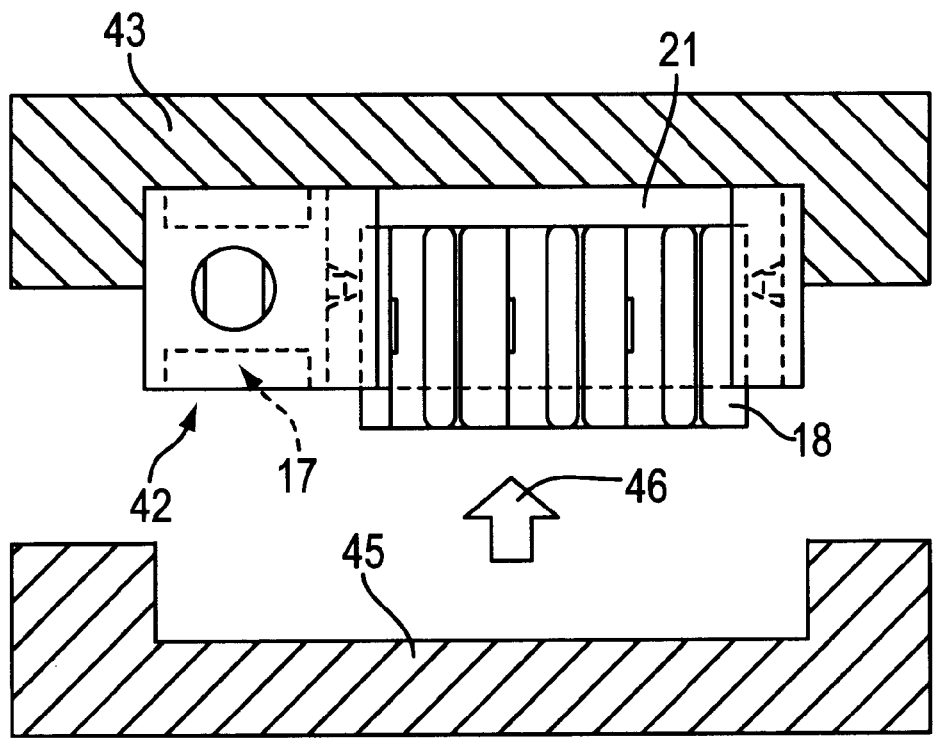
Figure 6B:
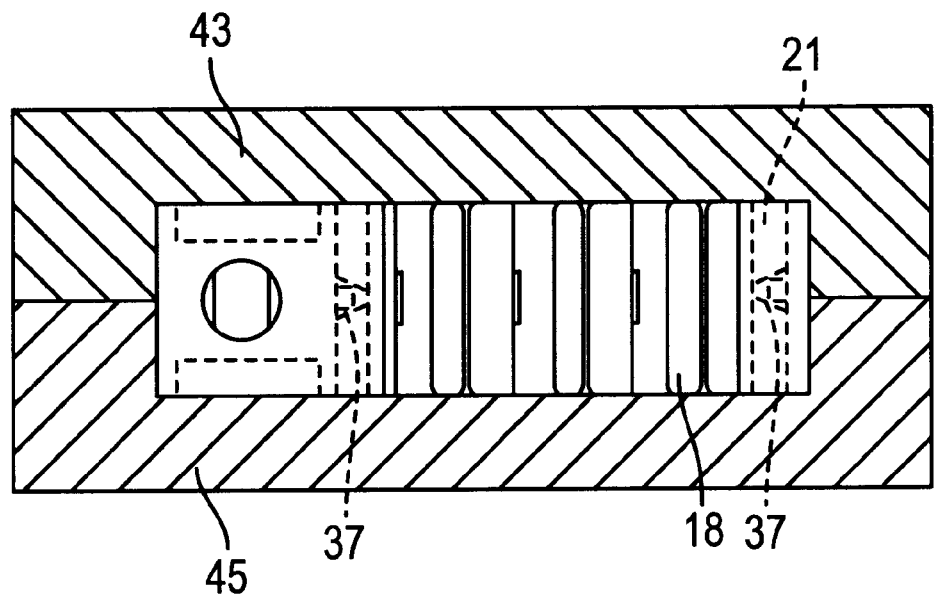

FIG. 6A and FIG. 6B are in plan view of the molding processes by using metal molds in the step (b) of FIG. 5, (A) shows the state before moving a metal mold and (B) shows the state after the move of the metal mold.

FIG. 7 is a diagram showing manufacturing steps of the fastener of FIG. 2 according to the present invention which are different from the ones shown in FIG. 5.

FIG. 8A and FIG. 8B is a diagram showing manufacturing steps of the fastener of FIG. 2 according to the present invention which are different from the ones shown in FIGS. 5 and 7.

Figure 9:
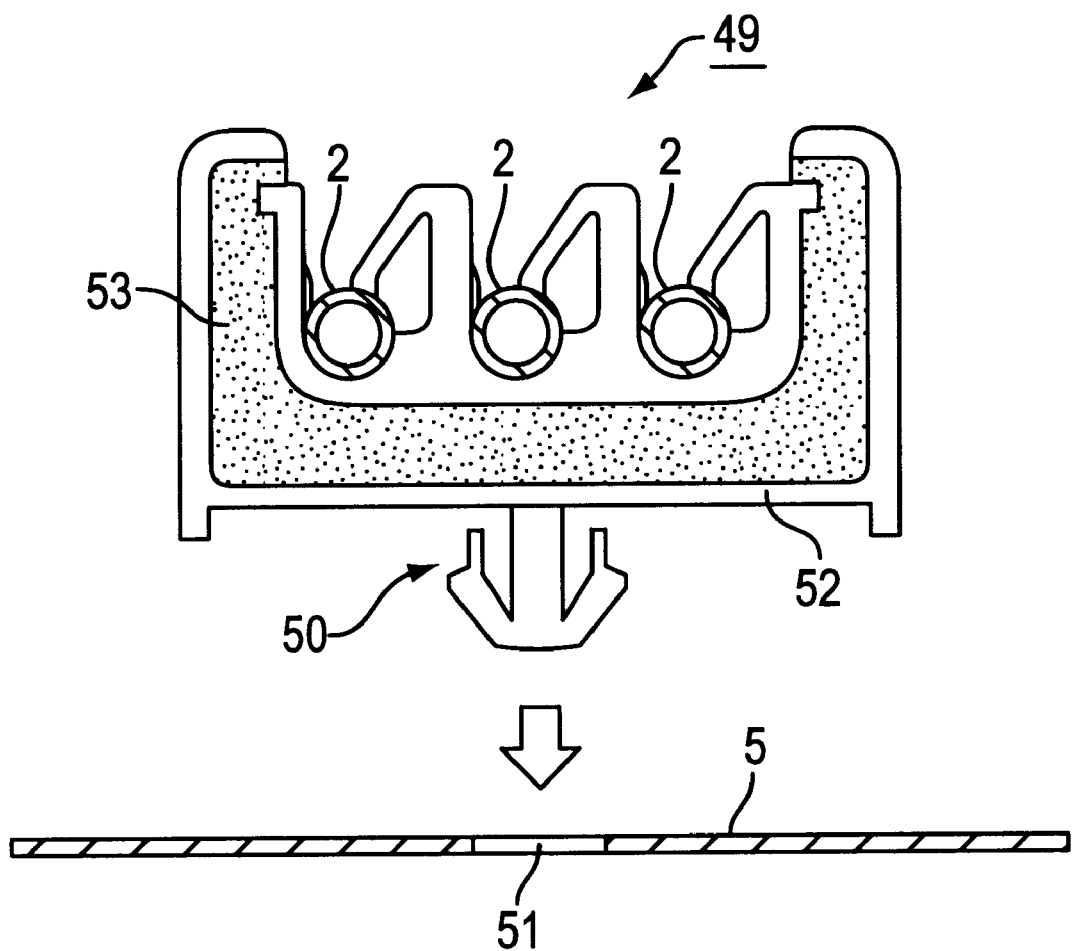

FIG. 9 is a front view of a variation of the fastener of FIG. 2.

Figure 10:
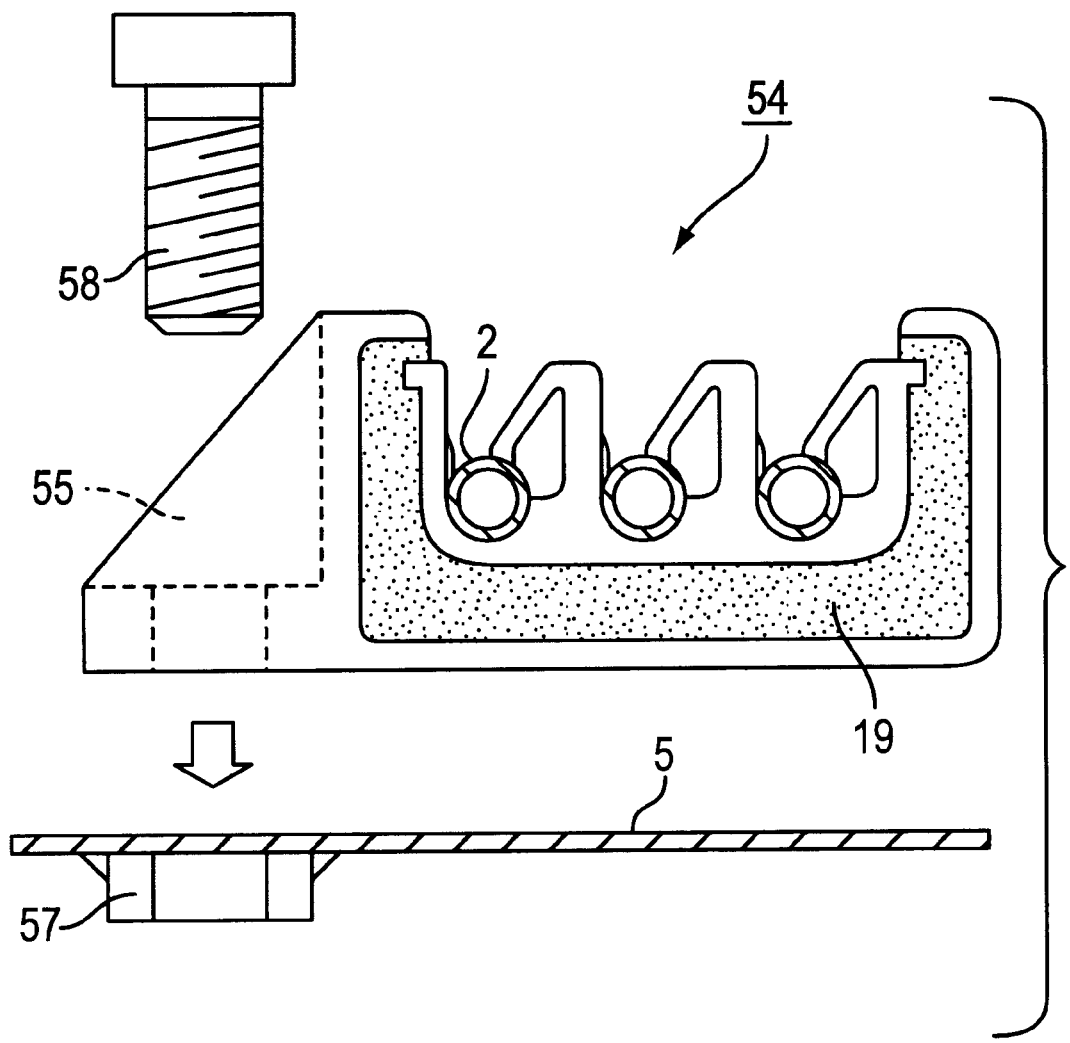

FIG. 10 is a front view of another variation of the fastener of FIG. 2.

Figure 11:
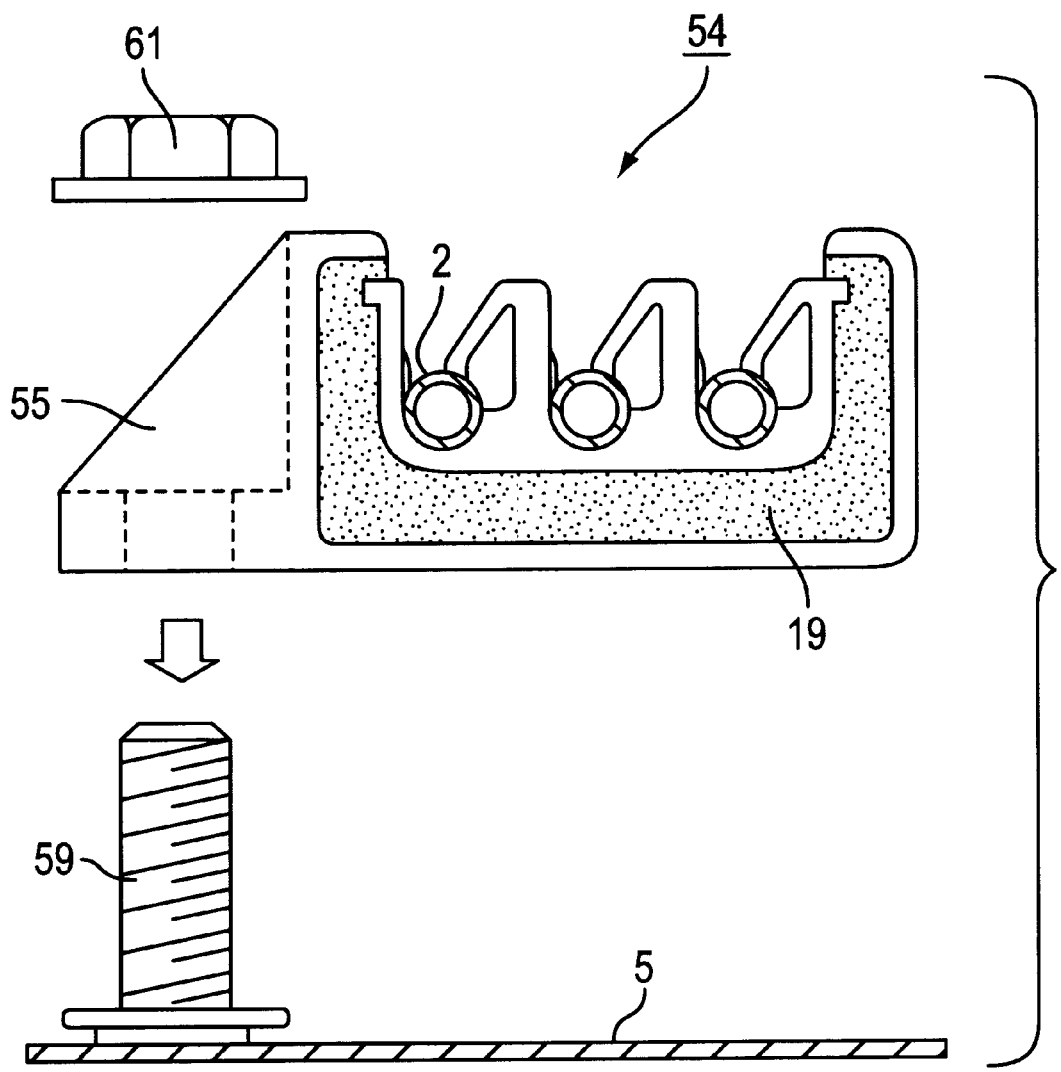

FIG. 11 is a front view of still another variation of the fastener of FIG. 2.

Figure 12:
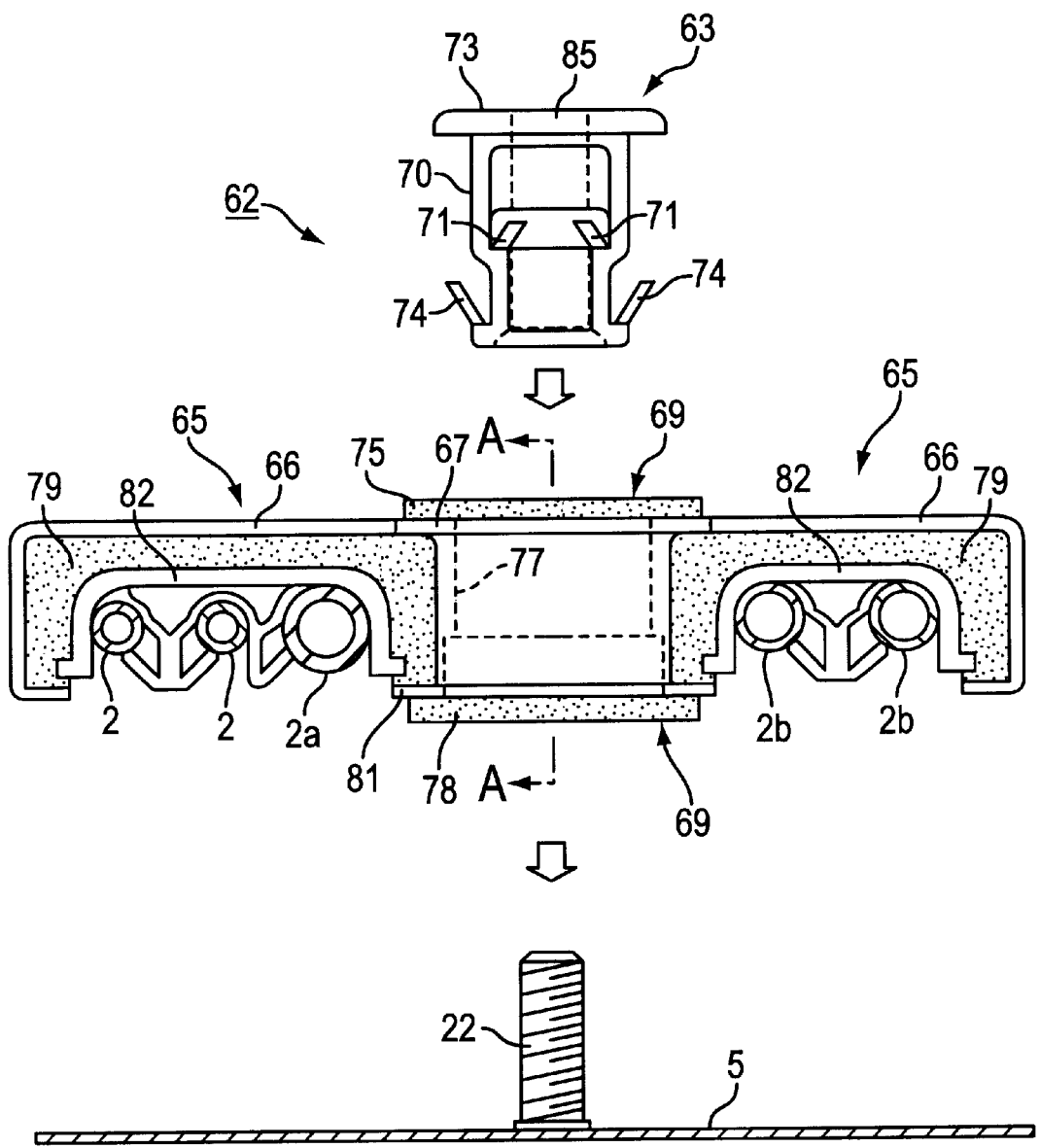

FIG. 12 is a front view of another embodiment fastener of the present invention.

Figure 13:
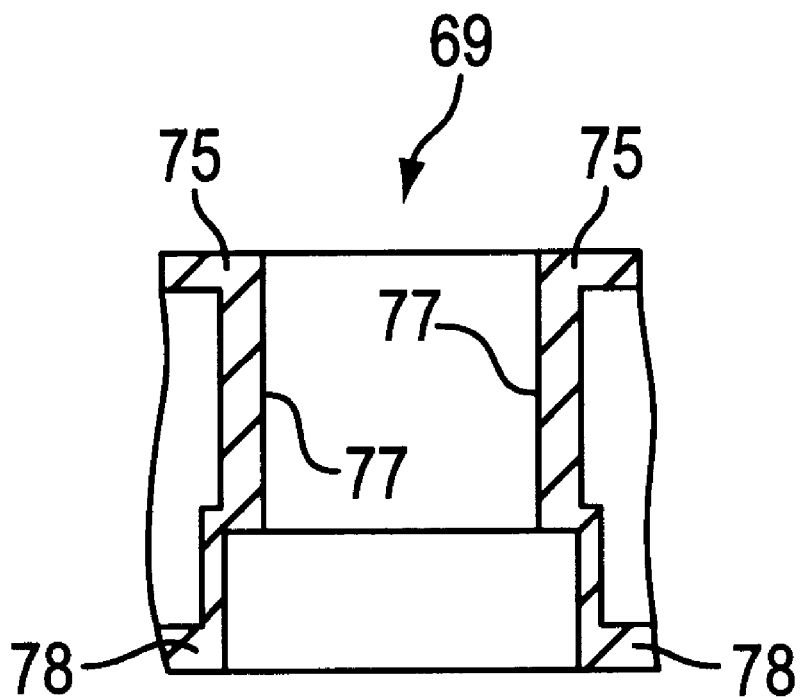

FIG. 13 is a sectional view of the vibration absorbing member of FIG. 12 taken along the line A—A of FIG. 12.

Figure 14:
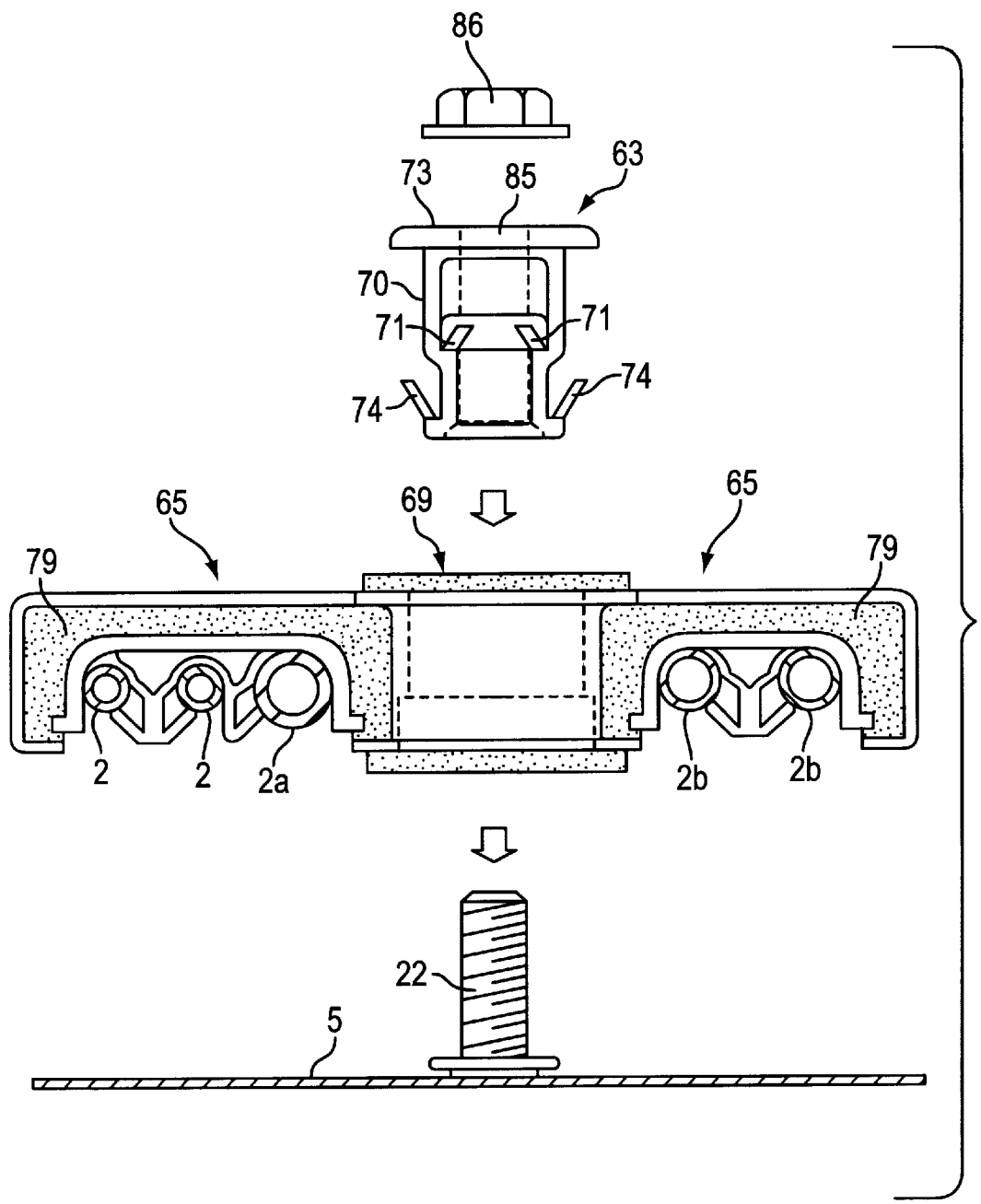

FIG. 14 is a front view of the fastener of FIG. 12 before attached to a panel, showing a different way of using it.

Figure 15:
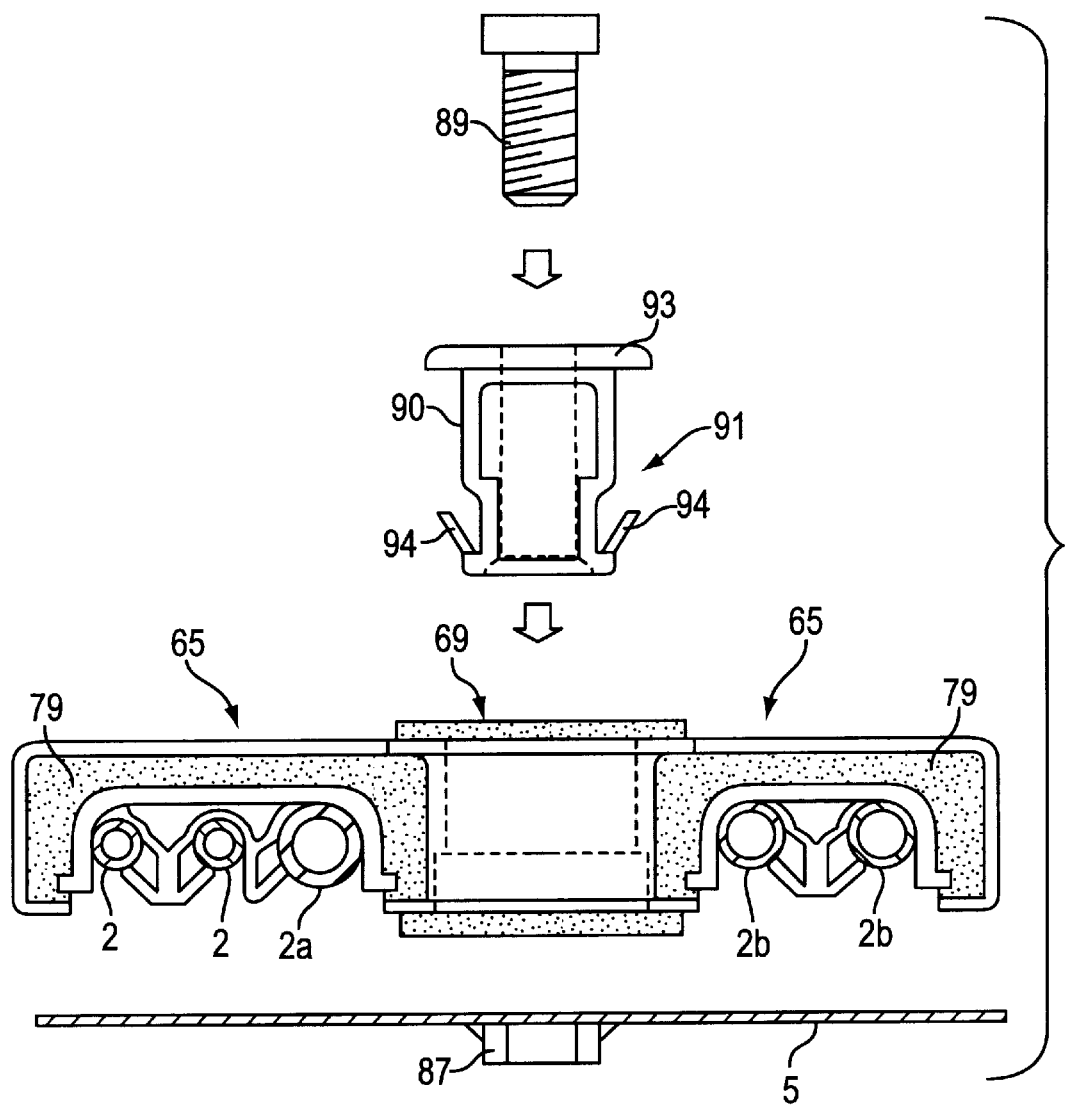

FIG. 15 is a front view of a variation of the fastener of FIG. 12 before attached to a panel.

DESCRIPTION OF THE INVENTION

Figure 3:
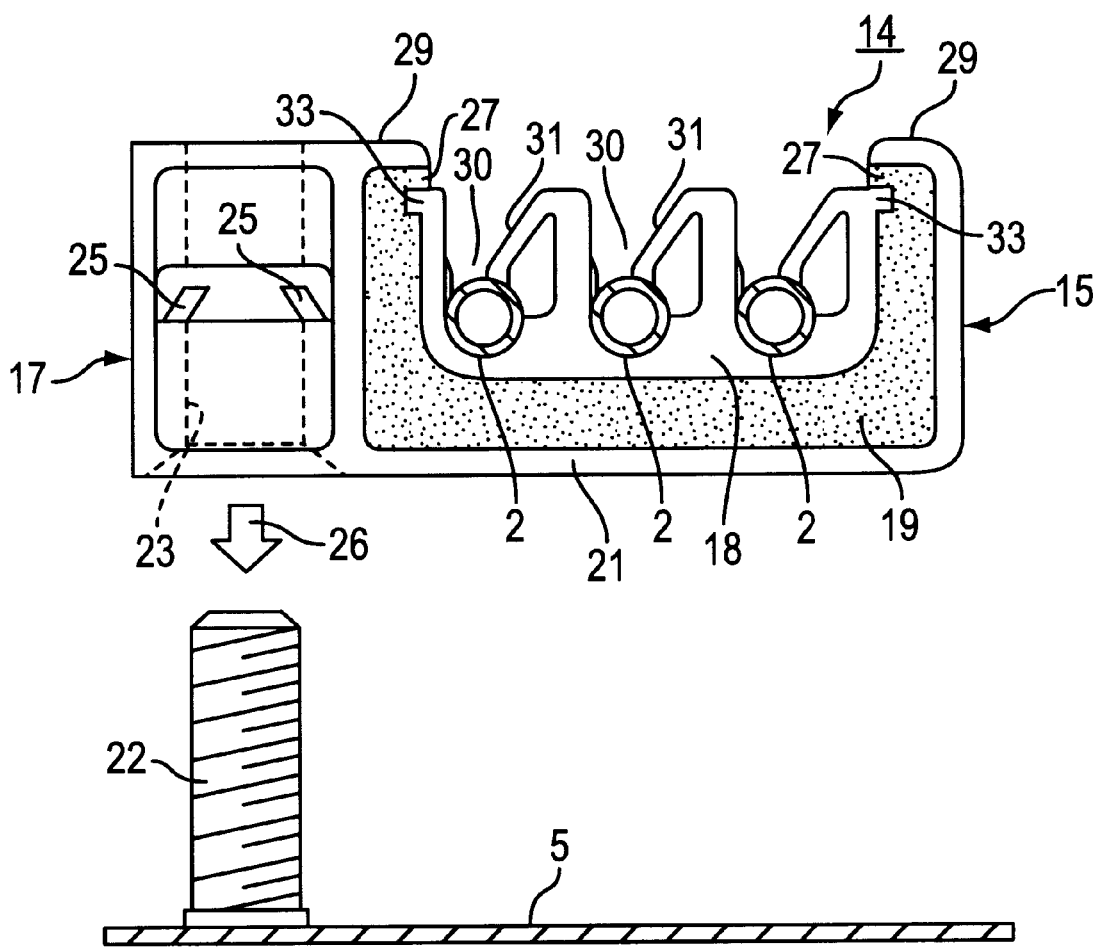
FIG. 3 is front view of the pipe fastener of the first embodiment of the present invention before it is attached to a panel.

The present invention is described further by way of embodiments, with reference of accompanying drawings. A pipe fastener 14 according to a first embodiment is shown in FIGS. 2 and 3. FIG. 2 shows details of the fastener 14. FIG. 3 shows procedure of attaching the pipe fastener 14. In FIGS. 2 and 3, the pipe fastener 14 is made up of pipe holder 15 to hold a plurality of pipes 2, and a panel fixing portion 17 to be fixed to the panel 5. The pipe holder 15 comprises a panel engagement portion 18 to receive the pipes 2 inside it and engage with them, a damper portion 19 which is disposed on the outer portion of the pipe engagement portion 18 and is made of a vibration absorbing material, and a holder portion 21 which holds the damper portion 19 from outside and is connected to the panel fixing portion 17. In the pipe holder 15, the pipe engagement portion 18, the damper portion 19 and the holder portion 21 are connected as one piece. The pipe engagement portion 18 and the holder portion 21 are made of hard resin while the damper portion 19 is made of soft resin which is highly vibration absorptive. The pipe engagement portion 18 and the holder 21 portion are connected only through the damper portion 19.

As shown in FIG. 3, the panel fixing portion 17 of the fastener 14 is so configured that it receives and holds a stud bolt 22 fixed to the panel 5 by welding or some other method. For this purpose, a hollow portion 23 to be penetrated by the stud bolt 22 is formed in the center and the hollow portion 23 is formed with a pair of bolt engagement pawls 25, 25 to engage with threads of the stud bolt 22. Accordingly, when pressed in the direction indicated by an arrow 26 of FIG. 3, the panel fixing portion 17 directly engages with the stud bolt 22 and is fixed to it. The panel fixing portion 17 connected to the holder portion 21 of the pipe fixing portion 15 by integrated molding. The holder portion 21 holds the damper portion 19 and forms the bottom of the pipe fixing portion 15 and one of the outer walls of the pipe fixing portion 15. Making use of the upright wall of the panel fixing portion 17, the holder portion enclose the bottom and both sides of the damper portion 19. In its upper portion, the holder portion 21 has engagement edges 29, 29 which engage with top edges 27, 27 on both sides of the damper portion 19. This prevents the damper portion 19 from slipping from the holder portion 21 in the direction of Z in FIG. 2 and the damper portion 19 is held reliably by the holder portion 21. The damper portion 19 is formed in such a configuration that it holds the pipe engagement portion 18 inside the holder portion 21, and is made of a material that absorbs vibrations transmitted to the pipes 2, resilient soft resin materials being typical of such a material.

The pipe engagement portion 18 held by the holder portion 21 has a substantially U-shaped, pipe-receiving grooves 30 opening upwardly, and resilient pipe retaining portions 31 extending diagonally from an upper end toward the bottom of each groove. Owing to them, as shown by the pipe 2 on the left in FIG. 2, when it is just pressed down from the position indicated by an imaginary line, the pipe 2 is seated in the groove 30 and held so as not to get off. The grooves 30 and the engagement portions 31 are formed to have shapes and sizes matching the diameters and sizes of pipes to be received so that pipes with different diameters can be received. On top ends on both sides of the pipe engagement portion 18, a pair of damper portion engagement portions 33, 33 extending outwardly to bite into the damper portion 19 are formed. They prevent the pipe engagement portion 18 from getting off in the direction Z of FIG. 2 and the damper portion 19 is held reliably. Thus, the pipes 2 held by the pipe engagement portion 18 are firmly held by the pipe fixing portion 15.

Figure 1:
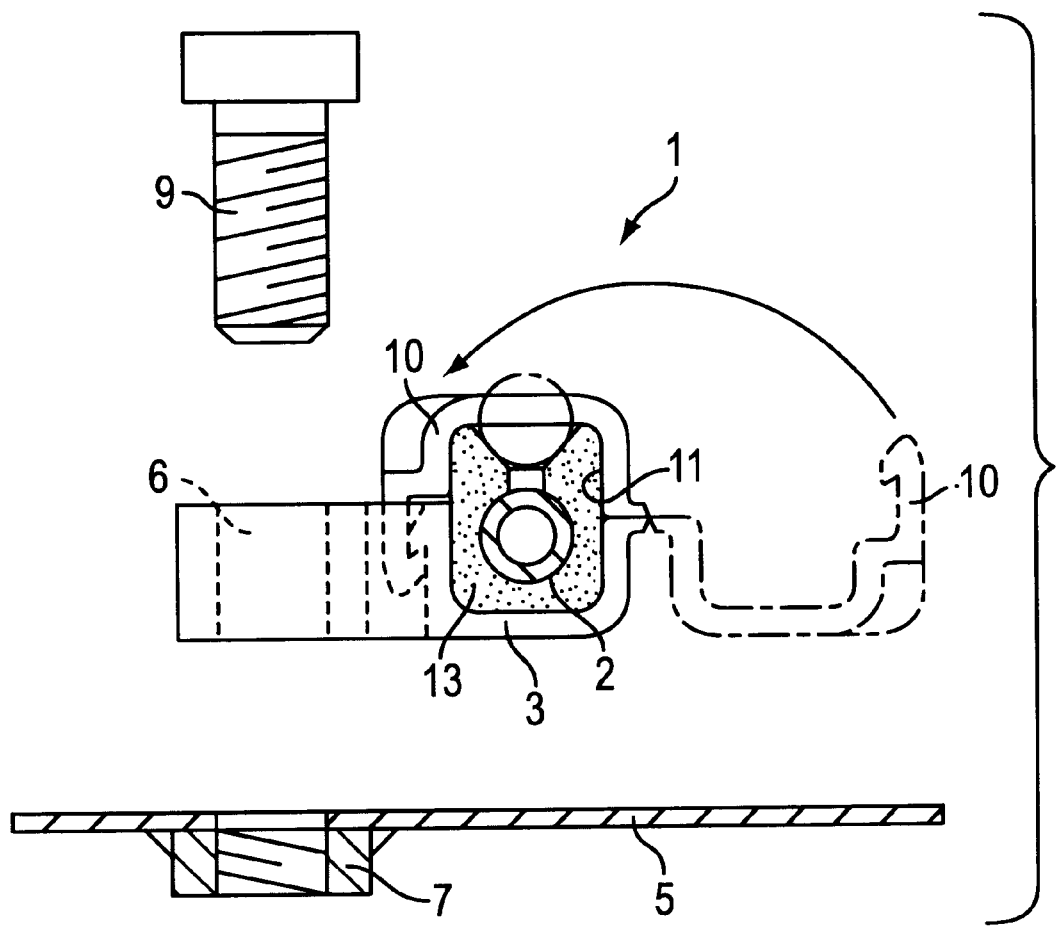
FIG. 1 is a front view of a conventional pipe fastener before it is attached to a panel.

As described above, the pipes 2 are attached to the fastener 14 easily by just pressing them into the grooves 30 of the pipe engagement portion 18 made of hard resin, without requiring the cover 10 of the conventional fastener 1 of FIG. 1, nor the work to swing the cover. Accordingly, for piping in predetermined positions of the vehicle body, it is possible to carry out pipe attachment operation by previously attached fasteners 14 to predetermined positions for a plurality of pipes and pressing them onto stud bolts on the vehicle body panel, that is, automation of piping operation can be promoted. Vibrations transmitted from the pipes 2 to the pipe engagement portion 18 are absorbed in the damper portion 19 and do not reach the holder portion 21, nor the panel fixing portion 17. Therefore, vibrations of the pipes are never transmitted from the panel fixing portion 17 engaging with the stud bolt 22 to the panel 5 and tranquillity is maintained in the car interior.

How to manufacture the fastener 14 is described in the following, with reference to FIGS. 4 through 6. To begin with, as shown in FIGS. 4(A), (B) and (C), the panel fixing portion 17, the holder portion 21 and the pipe engagement portion 18 are molded as one piece from the same hard resin material by the use of metal molds. In this molding of them as one piece, the panel fixing portion 17 and the holder portion 21 are molded straight but the pipe engagement portion 18 is shifted in parallel to the direction in which the pipes 2 extend, by a length L in FIG. 4(A) relatively to the holder portion 21 and the panel fixing portion 17. In this process of their integrated molding, the pipe engagement portion 18 and the holder portion 21 are connected to each other through thin portions 35, 35 and 37, 37 so as to define a space 34 in which the damper portion 19 is provided. These thin portions 35 and 37 connect a reinforcement rib 38 formed in a center portion of the inner wall surfaces of the holder portion 21 and a reinforcement rib 39 formed on the outer wall surfaces of the pipe engagement portion 18 correspondingly to the reinforcement rib 38. The thin portions 35 and 37 are broken when the pipe engagement portion 18 is moved so as to be in alignment with the panel fixing portion 17 and the holder portion 21. At two corners of the reinforcement rib 38 of the holder portion 21, tunnels 40 are provided in order for soft resin, which forms the damper portion 19, to be held by the holder portion 21. Similarly, tunnels 41 are provided at two corners of the reinforcement rib 39 in order for soft resin, which forms the damper portion 19, to be held by the pipe engagement portion 18.

In FIG. 5, a molded unit 42 shown in FIGS. 4 is molded by the use of a primary metal mold in the step (a). In the step (b), by the use of a secondary metal mold, soft resin is injected to mold the damper portion 19 while aligning the pipe engagement portion 18 shifted by the length L with the holder portion 21 and the panel fixing portion 17. As a result, the pipe fastener 14 shown in the step (c) is manufactured.

Molding of the damper portion 19 in the step (b) shown in FIG. 5 is explained with reference to FIGS. 6(A) and (B). First, as illustrated in FIG. 6(A), the molded unit 42 is set in a mold 43. At this time, the panel fixing portion 17 and the holder portion 21 are set inside the metal mold 43 but the pipe engagement portion 18 extends by the length L. Following the setting, the other mold 45 is moved in the direction indicated by an arrow 46 for mold tightening and at the same time, a soft resin material is injected to fill the space between the holder portion 21 and the pipe engagement portion 18. As shown in FIG. 6 (B), the move of the mold 45 breaks the thin portion 35 and 37 which have connected the pipe engagement portion 18 to the holder portion 21, and the pipe engagement portion 18 is aligned with the panel fixing portion 17 and the holder portion 21. During this process, the space 34 between the holder portion 21 and the pipe engagement portion 18 is filled with the soft resin material, which also fills the tunnels 40 of the reinforcement rib 38 of the holder portion 21 and tunnels 41 of the reinforcement rib 39 of the pipe engagement portion 18 and the damper portion 19 is formed between the holder portion 21 and the pipe engagement portion 18 in the state of being fixed to both of them. Thus, the fastener 14 is completed.

There is another method that can manufacture the fastener 14. In the step (a) shown in FIG. 7, the panel fixing portion 17 and the holder portion 21 are molded as one piece by using the same hard resin, and the pipe engagement portion 18 is molded also by using the same hard resin. In the step (b), the pipe engagement portion 18 is held to the holder portion 21, with a space kept between them for the damper portion to be provided there, and soft resin is injected into the space for the damper portion by using a secondary metal mold. This injection molding completes the fastener 14 as a finished product as shown in the step (c).

FIG. 8 shows still another manufacturing method. In this method, a molded unit 47 comprising the panel fixing portion 17 and the holder portion 21 which have been molded as one piece from hard resin, the pipe engagement portion 18 molded from the same hard resin, and the damper portion 19 made of soft resin as a vibration absorbing material are prepared as shown in the step (a). Then, as illustrated in the step (b), the fastener 14 is formed by connecting the molded unit 47, the pipe engagement portion 18 and the damper portion 19 together as one piece by means of, for example, gluing.

FIG. 9 shows a second embodiment pipe fastener. A fastener 49 has a panel fixing portion 50 formed as an anchor leg integratedly molded on the bottom of a holder portion 52. When inserted in a mounting hole 51 in the panel 5, the panel fixing portion 50 is fixed to the panel 5, thereby securing the pipes 2 to the panel 5. In the fastener 49, too, a damper portion 53 absorbs vibrations and the pipes 2 can be held without requiring a cover.

FIGS. 10 and 11 show still another embodiment fastener of the present invention in FIG. 10, a panel fixing portion 55 of a fastener 54 is fixed to the panel 5 by means of a nut 57 and a bolt 58 attached to the panel 5. In FIG. 11, the panel fixing portion 55 of the fastener 54 is fixed to the panel 5 by means of a bolt 59 provided to stand from the panel 5 and a nut 61. The damper portion 19 of this fastener 54 also absorbs vibrations and the fastener is capable of holding the pipes 2 without requiring a cover.

FIGS. 12 and 13 show still another pipe fastener 62. The fastener 62 comprises a bolt engagement clip 63 which serves as a panel fixing portion, and two pipe holders 65 positioned on both sides of the bolt engagement clip 63. A holder portion 66 of one of the two pipe holders 65 is integratedly connected with the holder portion 66 of the other pipe holder via a coupling portion 67. The bolt engagement clip 63 which is a panel fixing portion is molded separately from the pipe holders 65 but they are connected to each other by assembly. When assembled, the coupling portion 67 and the bolt engagement clip 63 are connected to each other via a tubular vibration absorbing member 69.

In FIGS. 12 and 13, the bolt engagement clip 63 has a hollow shank 70 to receive the stud bolt 22 fixed to the panel 5. The clip 63 further has engagement pawls 71 formed inside the shank 70, a head 73 formed on an end of the shank 70, and pipe holder engagement pawls 74 formed on the other end of the shank 70. The vibration absorbing member 69 comprises a tubular member through which the shank 70 of the bolt engagement clip 63 passes. The tubular vibration absorbing member 69 is indicated by broken lines in FIG. 12, and is shown also in FIG. 13 which is a sectional view taken along the line A—A of FIG. 12. The vibration absorbing member 69 comprises a first flange 75 to cover the outer portion of the coupling portion 67 connecting the two holder portions 66 together, a tubular body 77 to be penetrated by the clip shank 70, and a second flange 78 on the opposite side to the first flange 75, and is made of the same soft resin vibration absorbing material as that of damper portions 79. The second flange 78 covers the outer portion of a plate portion 81 below the coupling portion 67. The bolt engagement clip 63 is assembled to the vibration absorbing member 69. By this arrangement, vibrations increased when a large number of pipes 2, 2a, 2b and so forth are held in pipe engagement portions 82 of the holders 65 can be absorbed sufficiently by the vibration absorbing member 69 as well as the damper portions 79 and quietness can be maintained in the car interior.

FIG. 14 shows a different way of using the bolt engagement clip 63 for use with the fastener of the FIGS. 12 and 13. The head 73 of the clip 63 is formed with a hole 85 through which the stud bolt 22 extends. A nut 86 is screwed round the stud bolt 22 projecting from the head 73 so as to fix the clip 63 to the stud bolt 22 even more firmly. In this case, the engagement pawls 71 of the clip 63 function for temporary fixing to the stud bolt 22 and the nut 86 fixes the clip 63 permanently. Thus, the clip 63 is also usable for temporary fixing.

FIG. 15 shows a variation of the bolt engagement clip 63, i.e., the panel fixing portion of the fastener of FIGS. 12 and 13. In FIG. 15, the panel fixing portion comprises a spacer clip 91 having a hollow shank 90 for receiving a bolt 89 to be screwed into a nut 87 fixed to the panel 5. The spacer clip 91 has a head 93 formed on an end of the shank 90, and pipe holder engagement pawls 94 formed on the other end of the shank 90. Explanation of the vibration absorbing member 69 is omitted as it is the same as the one shown in FIGS. 12 and 13. Since the spacer clip 91 is fixed to the panel 5 reliably by the bolt 89 and the nut 87, it fulfills the function to fix the pipe holders 65 to the panel 5. In addition, it fulfills the function to keep the panel 5 separated from the pipes 2, 2*a* . . . by a certain space by preventing the pipe holders 65 from being pressed excessively onto the surface of the panel 5. In the embodiment, too, increased vibrations of the pipes 2, 2*a* . . . in the pipe holders 65 are sufficiently absorbed by the vibration absorbing member 69 as well as the damper portions 79 and quietness is maintained in the car interior.

According to the present invention, the pipe holder comprises a pipe engagement portion inside it, a damper portion on the outer portion of the pipe engagement portion and the holder portion provided on the outer portion of the damper portion, and the pipe engagement portion, the damper portion and the holder portion are connected together as one piece. Therefore, pipes are held simply when they are pressed into the pipe engagement portion, vibrations of which are absorbed by the damper portion so as not to be transmitted to the holder portion and the panel fixing portion. Thus, the fastener is capable of preventing vibrations from being transmitted to the panel, holding pipes without requiring a cover while retaining the vibration absorbing function, allowing pipes to be attached with ease, maintaining a high mounting force of the pipes, and keeping the car interior quiet.

The present invention also provides a method of manufacturing the above-described fastener which comprises a step to mold the panel fixing portion and the holder portion and the pipe engagement portion of the panel holder as one piece by using the same hard resin while forming thin portions for making a space, in which the damper portion is to be provided, between the pipe engagement portion and the holder portion, and a step to form the damper portion by injecting a vibration absorbing material into the space between the pipe engagement portion and the holder portion of the member molding as one piece. According to this method, the pipe fastener can be molded by using molds. Besides the manufacturing method stated above there is another manufacturing method of the fastener, comprising a step to mold the panel fixing portion and the holder portion of the pipe holder as one piece by using the same hard resin, a step to hold the pipe engagement portion molded from the same hard resin to the holder portion of the member molded as one piece, with a space kept for providing the damper portion, and a step to mold the damper portion by injecting a vibration absorbing material into the space between the pipe engagement portion and the holder portion. There is still another method of manufacturing the fastener, comprising a step to prepare the panel fixing portion and the holder portion of the pipe holder molded as one piece by using the same hard resin, the pipe engagement portion molded by using the same hard resin, and the damper portion made of a soft resin vibration absorbing material, and a step to place the damper portion between the pipe engagement portion and the holder portion and to connect the pipe engagement portion and the holder portion together as one piece by means of the damper portion.

What is claimed is:

1. A pipe fastener for use to fix pipes to a panel, comprising a pipe holder to hold pipes and a panel fixing portion to be fixed to the panel; characterized in that said pipe holder comprises a pipe engagement portion made of hard resin which receives the pipes inside thereof to engage with the pipes and having an outer surface portion, a damper portion of a vibration absorbing material disposed on the outer surface portion of the pipe engagement portion, and a holder portion connected to the panel fixing portion to hold an outer portion of the damper portion; the pipe engagement portion, the damper portion and the holder portion being coupled as one piece with said pipe engagement portion and said holder portion being coupled only through said damper portion which is interposed therebetween to reduce the transmission of vibration between said pipe engagement portion and said holder portion.

2. The fastener according to claim 1 wherein the holder portion is made of hard resin and the damper portion is made of soft resin.

3. The fastener according to claim 1 wherein the panel fixing portion has means to receive a stud bolt fixed to the panel to engage with it.

4. The fastener according to claim 1 wherein the panel fixing portion is formed so as to be fixed to the panel by a bolt and a nut.

5. A pipe fastener for use to fix pipes to a panel, comprising two pipe holders to hold pipes and a panel fixing portion to be fixed to the panel, said panel fixing portion being disposed between said pipe holders;

characterized in that each of said pipe holders comprises a pipe engagement portion which receives the pipes inside thereof to engage with the pipes and having an outer surface portion, a damper portion of a vibration absorbing material disposed on the outer surface portion of the pipe engagement portion, and a holder portion connected to the panel fixing portion to hold a outer surface portion of an damper portion;

the pipe engagement portion, the damper portion and the holder portion being connected with each other as one piece;

a coupling portion connecting said pipe holders together, the coupling portion of the holder portions being connected with the panel fixing portion through a vibration absorbing member; and wherein said panel fixing portion comprises a bolt engagement clip having a hollow shank for receiving a bolt fixed to the panel, the clip having bolt engagement pawls formed inside the shank, a head formed at an end of the shank and pipe holder engagement pawls formed on the other end of the shank, and the vibration absorbing member comprises a tubular member to be penetrated by the shank of the bolt engagement clip and is located between the clip and the pipe holders.

6. The fastener according to claim 5 wherein the head is formed with a hole for receiving a bolt and with a surface surrounding said hole for engagement with a nut.

7. A pipe fastener for use to fix pipes to a panel, comprising two pipe holders to hold pipes and a panel fixing portion to be fixed to the panel, said panel fixing portion being disposed between said pipe holders;

characterized in that each of said pipe holders comprises a pipe engagement portion which receives the pipes inside thereof to engage with the pipes and having an outer surface portion, a damper portion of a vibration absorbing material disposed on the outer surface portion of the pipe engagement portion, and a holder portion connected to the panel fixing portion to hold an outer surface portion of the damper portion;

the pipe engagement portion, the damper portion and the holder portion being connected with each other as one piece;

a coupling portion connecting said pipe holders together, the coupling portion of the holder portions being connected with the panel fixing portion through a vibration absorbing member; and wherein said panel fixing portion comprises a spacer clip having a hollow shank for receiving a bolt to be attached to a panel, said clip having a head formed at an end of the shank and pipe holder engagement pawls formed at the other end of the shank, wherein said vibration absorbing member comprises a tubular member to be penetrated by the shank of the spacer clip and is located between the clip and the pipe holders.

8. A pipe fastener for use to fix pipes to a panel, comprising two pipe holders to hold pipes and a panel fixing portion to be fixed to the panel; characterized:

in that each of said two pipe holders comprises a pipe engagement portion made of hard resin which receives the pipes inside thereof to engage with the pipes and having an outer surface portion, a damper portion of a vibration absorbing material disposed on the outer surface portion of the pipe engagement portion, and a holder portion connected to the panel fixing portion to hold an outer portion of the damper portion;

in that said two pipe holders are provided on opposite sides of the panel fixing portion, a coupling portion integrally connecting together the holder portions of the two pipe holders, the coupling portion being connected with the panel fixing portion through a vibration absorbing member; and in that, in each pipe holder, the pipe engagement portion, the damper portion and the holder portion being connected with each other as one piece with said damper portion interposed between said pipe engagement portion and said holder portion to reduce the transmission of vibration therebetween.

* * * * *